United States Patent [19]

Nakamura

[11] Patent Number: 5,024,250

[45] Date of Patent: Jun. 18, 1991

[54] PISTON TYPE ACCUMULATOR FOR HYDRAULIC SYSTEM

[75] Inventor: Masao Nakamura, Hyogo, Japan

[73] Assignee: Nakamura Koki Co., Ltd., Hyogo, Japan

[21] Appl. No.: 462,407

[22] Filed: Jan. 9, 1990

[30] Foreign Application Priority Data

Jan. 10, 1989 [JP] Japan .................................. 1-4390

[51] Int. Cl.[5] .................... F16L 55/04; F01B 25/26

[52] U.S. Cl. .................................. 138/31; 92/5 R; 91/1; 91/DIG. 4; 138/104

[58] Field of Search ................ 92/5 R; 91/1, DIG. 4; 138/31, 104; 116/227, 228, DIG. 21

[56] References Cited

U.S. PATENT DOCUMENTS

| | | | |
|---|---|---|---|
| 3,862,646 | 1/1975 | Tarsha | 138/31 |
| 4,014,213 | 3/1977 | Parquet | 138/104 |
| 4,207,563 | 6/1980 | Soupal | 138/31 |
| 4,577,663 | 3/1986 | Anderson et al. | 138/31 |
| 4,611,634 | 9/1986 | Kruckewitt et al. | 138/31 |
| 4,644,976 | 2/1987 | Peter et al. | 138/31 |
| 4,656,881 | 4/1987 | Goedecke | 92/5 R |
| 4,691,739 | 9/1987 | Gooden | 138/31 |
| 4,709,653 | 1/1987 | Salomon | 116/228 |
| 4,714,093 | 12/1987 | Kawano | 138/30 |
| 4,799,048 | 1/1989 | Goshima et al. | 138/31 |
| 4,876,945 | 10/1989 | Stoll et al. | 92/5 R |

FOREIGN PATENT DOCUMENTS

| | | | |
|---|---|---|---|
| 0003925 | 9/1979 | European Pat. Off. | 138/31 |
| 3229945 | 2/1984 | Fed. Rep. of Germany | 92/5 R |
| 0908175 | 4/1946 | France | 138/31 |
| 0048119 | 4/1977 | Japan | 138/31 |
| 0138966 | 10/1979 | Japan | 92/5 R |
| 1229506 | 5/1986 | U.S.S.R. | 138/31 |
| 2056692 | 3/1981 | United Kingdom | 92/5 R |
| 2106984 | 4/1983 | United Kingdom | 92/5 R |

*Primary Examiner*—John T. Kwon
*Assistant Examiner*—Thomas Denion
*Attorney, Agent, or Firm*—Lowe, Price, LeBlanc and Becker

[57] ABSTRACT

A piston type accumulator has a detection device that informs a user about the position of the piston incorporated therein. Abnormalities in the hydraulic system operations e.g., a gas leak from a gas chamber bounded by the piston or the sudden turning on of a fluid-actuated device in the system, can cause an excessive movement of the piston; likewise, clogging of lines or the sudden stoppage of a fluid-actuated device may cause a fluid pressure rise in the system and, consequently, a displacement of the piston to actuate the detection device. In this invention, the position of the piston is detected by use of a permanent magnet that actuates a reed relay or moves a magnetic inductive indicator installed on the outside of a accumulator shell to be readily visible thereat.

7 Claims, 7 Drawing Sheets

PISTON TYPE ACCUMULATOR FOR HYDRAULIC SYSTEM

FIELD OF THE INVENTION

This invention relates to a fluid accumulator in a hydraulic system, with the facility for providing information on the position of a reciprocating piston incorporated therein. More particularly, this invention concerns a piston type accumulator which permits a user to detect the displacement of a piston therein caused by temporary accumulating or discharging of oil contained in the hydraulic system.

BACKGROUND OF THE PRIOR ART

A fluid accumulator is typically used in a hydraulic system for preventing the pressure of a hydraulic fluid, e.g., an oil, from rising excessively or falling suddenly due to temporary accumulating or discharging of oil contained in the hydraulic system. For example, the accumulator temporarily accumulates oil fed from a pump while a fluid-actuated device such as a hydraulic motor is turned off. When the device is actuated again, the accumulator discharges accumulated oil and feeds it rapidly to the device until more oil from the pump reaches the device.

The accumulator is generally classified as either a bladder type accumulator or one of a piston type. A bladder type accumulator usually comprises a cylindrical shell and a gasprecharged rubber bladder incorporated therein, which is inflated and deflated in response to the change of pressure of oil contained in the hydraulic system. A piston type accumulator comprises a cylindrical shell and a reciprocating piston therein, which changes the volume of an oil chamber and that of a gas chamber bounded thereby. The behavior of the bladder in response to oil flows into or out from an accumulator is more sensitive than that of the piston and accordingly, a bladder type accumulator is very often adopted in a hydraulic system. The piston type accumulator, however, is not provided with a gas-filled rubber bladder therein, hence problems associated with the bladder, e.g., injury and blowout thereof, will not be encountered in its use. This means that a piston type accumulator operates safely in a hydraulic system.

The gas chamber of a piston type accumulator is precharged with inert gas at a pressure, for example, of 850 $lb/in^2$ or 59.76 $kg/cm^2$. When the hydraulic system is pressurized to, for example, 3,000 $lb/in^2$ or 210.93 $kg/cm^2$, the oil flows into the oil chamber volume. The gas chamber is thereby reduced and the internal pressure thereof rises. Oil continues to flow into the accumulator until the pressure in the gas chamber rises to 3,000 $lb/in^2$, at which time oil in volume equal to the reduction in volume of the gas chamber is accumulated in the oil chamber. Contrarily, when oil in the accumulator is discharged therefrom, the pressure in the gas chamber decreases until it reaches 850 $lb/in^2$ and the piston is restored to an initial position thereof.

It is difficult to perfectly prevent precharged gas in the gas chamber from leaking out of the shell or leaking into the oil chamber through minute clearances between the inner surface of the shell and covers thereof or the piston. Leakage of gas makes the initial pressure of precharged gas decrease, whereby the operational functions of the accumulator and of the hydraulic system become abnormal.

In order to maintain normal operation of the hydraulic system, it is important that the initial pressure of precharged gas is sustained in the oil chamber of an accumulator. Therefore, the precharged pressure should be checked often the users. The precharged pressure in a conventional accumulator, however, cannot readily be inspected while the accumulator is connected with the hydraulic system. When being inspected, the accumulator should therefore be released from piping of the hydraulic system. This means that the operation of the hydraulic system must be stopped.

In U.S. Pat. No. 4,714,093 the bladder type accumulator enabling a user to observe the inflation and deflation of the bladder is disclosed. The bladder type accumulator comprises a containment shell, a collapsible bladder capable of internal pressurization located within the containment shell so that the hydraulic fluid occupies a space between the inner surface of the shell and the outer surface of collapsible bladder as the fluid is accumulated in the accumulator, and a bladder condition detecting device inside the bladder actuated by movement of the collapsible bladder walls. The detecting device includes, for example, a tube inside the bladder, a slider moving along the tube and a reed switch for detecting movement of the slider by means of the magnetic force of a permanent magnet carried thereby.

The detecting device described above, however, is not available to a piston type accumulator because no collapsible bladder is provided inside the containment shell thereof. Therefore, in the bladder type accumulator troubles in fluid-actuated devices or piping in the hydraulic system can not be detected by reliance on an abnormal behavior of the piston. For instance, trouble may not be found until the device works beyond a desired range or a large quantity of oil has leaked out. The trouble, if not found at an early stage, develops further, and much time and labor will be required for repairing the system. To avoid these problems, a piston type accumulator is proposed so as to indicated the position of a piston inside the shell, connected with the hydraulic system.

SUMMARY OF THE INVENTION

A principal object of this invention is to enable detection of the behavior of a reciprocating piston incorporated in a piston type fluid accumulator so that problems in fluid-actuated devices, piping, valves or the accumulator in a hydraulic system may be readily detected in response to a signal indicating present a position of the piston.

This object is achieved by providing in a piston type fluid accumulator for a hydraulic system: a containment shell, a piston capable of reciprocating inside the containment shell so that the hydraulic fluid is thereby accumulated or discharged in the shell and a piston positon detecting device actuated by displacement of the reciprocating piston. The detecting device in a preferred embodiment includes a non-magnetic inductive rod moved in response to the displacement of the piston and a reed switch for detecting movement of the rod.

In one aspect of the invention a non-magnetic inductive rod pushed by the piston carries a permanent magnet mounted thereon, which actuates one or more conventional reed switchs installed on a gas-tight cylindrical cover fixed to the containment shell.

In another aspect of the invention, a piston carries a permanent magnet by means of chain in a U-shaped gas-tight tube fixed to the containment shell, and the magnet moves a slidable magnetic inductive indicator along the outer surface of the tube.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE PREFERRED EMBODIMENTS

Figure 1:
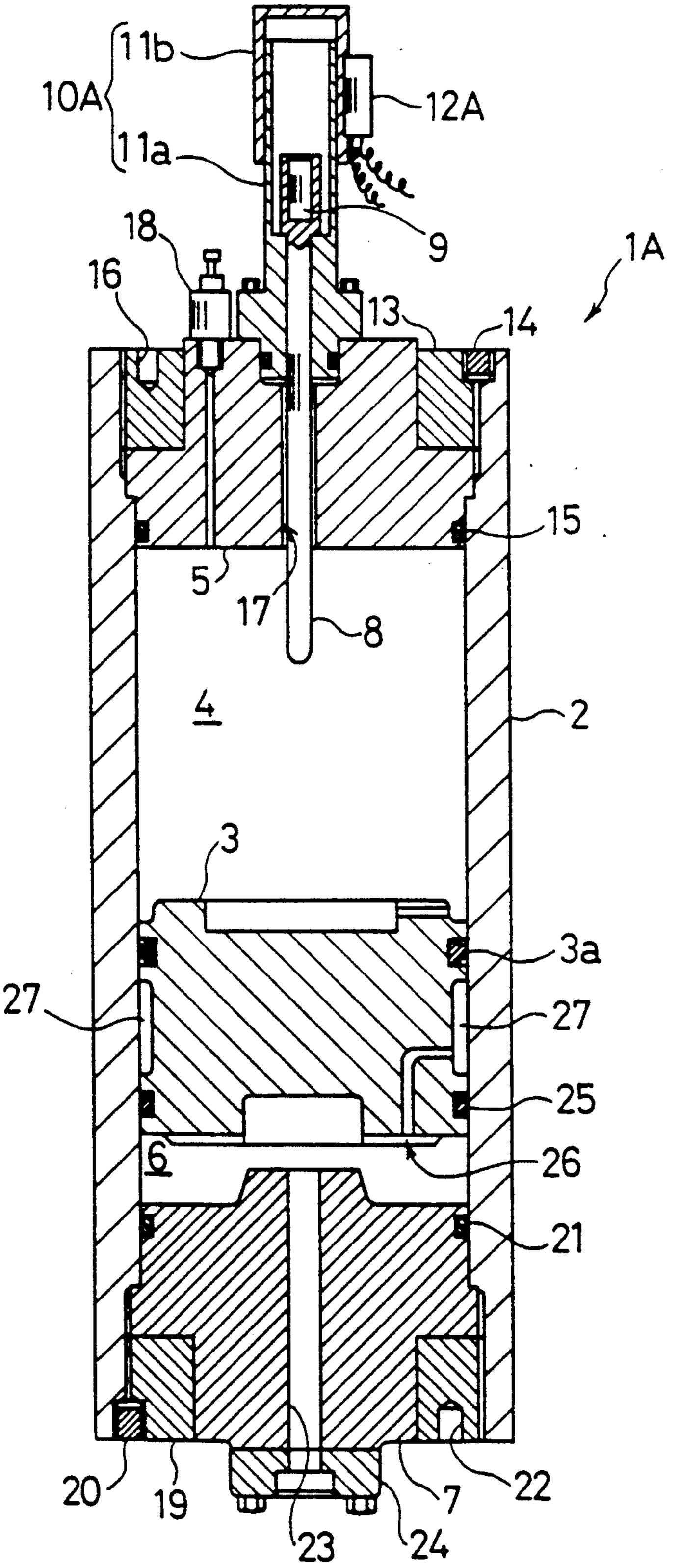
FIG. 1 is a sectional view of a vertical accumulator according to this invention provided with a device for detecting excessive displacement of a piston.

Referring to FIG. 1, a vertical accumulator 1A comprises a cylindrical containment shell 2, a reciprocating piston 3 incorporated therein, a head cover 5 shutting up a gas chamber 4 bounded by the piston 3 incorporated in the shell 2 and a bottom cover 7 shutting up an oil chamber 6 bounded by the piston 3. The gas chamber 4 is precharged with presurized gas which restores the piston 3. The oil chamber 6 communicates with piping (now shown) of a hydraulic system.

A non-magnetic inductive detecting rod 8, preferably made of stainless steel or brass is inserted movably into the gas chamber 4 through the head cover 5, and is formed and disposed so as to be pushed upward when the piston 3 rises excessively. The upper part of the rod 8 outside the containment shell 2 is provided with a permanent magnet 9.

To the head cover 5 is fixed a cylindrical cover 10A which covers gas-tightly the range of the movement of the magnet 9. This cover 10A is also made of stainless steel or brass, an inner space thereof is communicated with the gas chamber 4 through a guide hole 17 formed in the head cover 5. The cylindrical cover 10A comprises a cylindrical trunk part 11*a* and a switch holder 11*b* shutting up the trunk part 11*a*. The switch holder 11*b* is provided with a reed relay 12A actuated by the magnetic force of the magnet 9 brought close thereto, when oil contained in the hydraulic system is accumulated excessively in the oil chamber 6.

The head cover 5 is fixed to the upper part of the shell 2 by a ringed bolt 13 which is prevented from turning by a small screw 14. A seal ring 15 is disposed between the head cover 5 and the shell 2 so that precharged gas is gas chamber 4 is prevented from leaking out. A wrench hole 16 is formed on the top of the ringed bolt 13, whereby enables a user to fasten the ringed bolt 13 tightly to the shell 2 or to release it easily therefrom. The long guide hole 17 is formed on the center of the head cover 5 in order to guide movement of the detecting rod 8. Pressurized gas, e.g., nitrogen or argon, is precharged into the gas chamber 4 through a gas valve 18.

The bottom cover 7 is fixed to the lower part of the shell 2 by a ringed bolt 19 which is prevented from turning by a small screw 20. A seal ring 21 is disposed between the bottom cover 7 and the shell 2 so that accumulated oil is prevented from leaking out of oil chamber 6. A wrench hole 22 is provided on the ringed bolt 19, to enable a user to fasten the ringed bolt 19 tightly to the shell 2 or release it easily therefrom. An oil port 23 is formed on the center line of the bottom cover 7 and is communicated with piping (not shown) of the hydraulic system through a joint 24 connected thereto.

The piston 3 is provided with a piston ring 3*a* and an oil seal 25. An oil path 26 formed in the piston 3 is communicated with the oil chamber 6 and a peripheral groove 27 so that a part of accumulated oil is supplied to the clearance between the piston 3 and the shell 2 in order to lubricate a sliding surface of the piston ring 3*a*.

Under the condition of no leakage of the precharged gas in the gas chamber 4, the volume thereof is kept to predetermined minimum volume. The piston 3 moves in the range of its normal stroke, when oil at a maximum allowable pressure flows into the oil chamber 6. Piston 3 does not, in such normal circumstances push the detecting rod 8, hence the permanent magnet 9 stays at a mother position i.e., at the lower end of the cylindrical cover 10A. The reed relay 12A is then far from the magnet 9 and is not actuated thereby.

Figure 2:
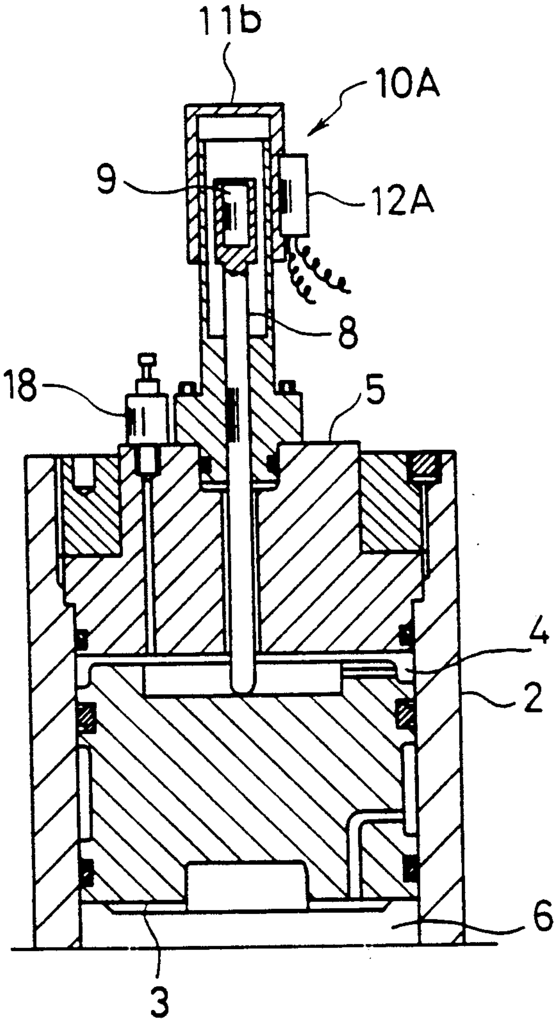
FIG. 2 is a sectional view of the upper half part of the accumulator per FIG. 1, in a state where the piston has moved excessively.

When the precharged gas in the gas chamber 4 leaks out, for example, by leaking out of the shell 2 or leaking into the oil chamber 6, the quantity of gas in chamber 4 decreases. The minimum volume of the gas chamber 4 under such an abnormal inner pressure becomes smaller than that under normal precharged pressure, whereby the piston 3 rises upward excessively when the oil at a maximum allowable pressure flows into the oil chamber 6. Piston 3 then comes into contact with the detecting rod 8 and push it upward. The permanent magnet 9, as shown in FIG. 2, is thereby brought close to the reed relay 12A. The reed relay 12A is actuated by a magnetic force of the magnet 9, and gives an alarm signal. When the magnet 9 recedes from the reed relay 12A due to gravity after the piston 3 descends by means of discharging accumulated oil from the oil chamber 6, the warning is cancelled.

Figure 3:
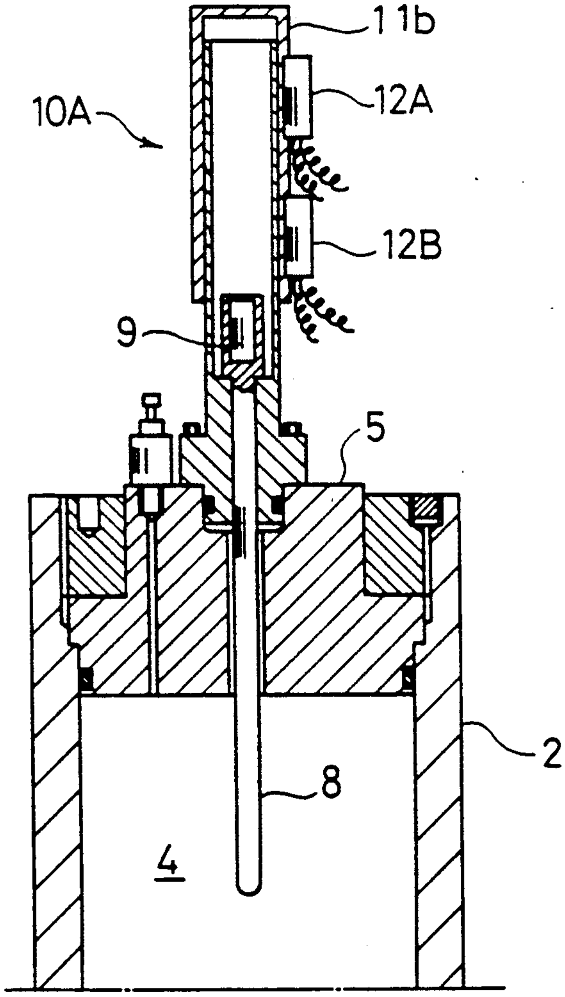
FIG. 3 is a sectional view of the upper half part of the vertical accumulator mounting plural reed switches.

FIG. 3, illustrates an embodiment in which plural reed relays 12A, 12B are disposed on the switch holder 11*b* so as to detect upper and lower positions of the piston 3. Actuating of the reed relay 12B serves to indicate that the piston 3 moves normally under no leakage of the gas from the gas chamber 4, while actuating the reed relay 12A indicates that it has moved abnormally under leakage of the gas therefrom. Hence, actuation of the latter indicates that the pressure of gas filled in the gas chamber 4 decreases.

Figure 4:
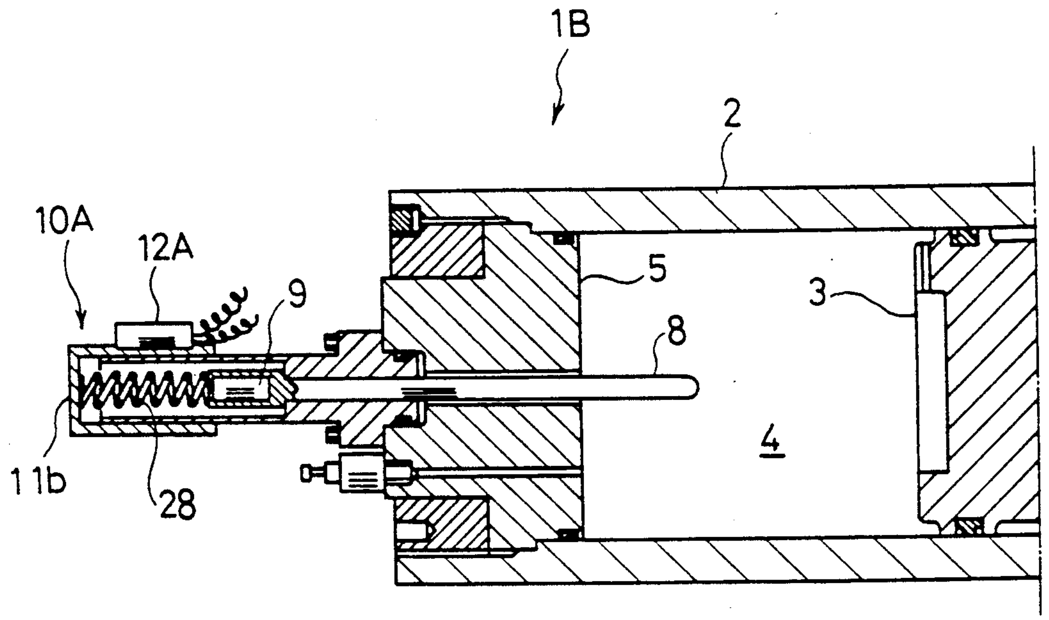
FIG. 4 is a sectional view of a horizontal accumulator provided with a device for detecting excessive displacement of the piston.

Referring to FIG. 4, a horizontal accumulator 1B is provided with a reed relay 12A installed on a cylindrical cover 10A, in which a permanent magnet 9 mounted on the edge part of a lateral detecting rod 8 is subjected to a biasing force exerted by a spring 28 toward a mother position. When the detecting rod 8 is pushed by the piston 3, the magnet 9 is brought close to the reed relay 12A in opposition to the biasing force of the spring 28. If the piston 3 moves excessively to the left-hand side, as seen in FIG. 4 the reed relay 12A is actuated by the magnet 9 close thereto, and an alarm signal occurs therefrom. Contrarily, when the accumulated oil in the oil chamber 6 is discharged, the magnet 9 is restored to the mother position by the biasing force of the spring 28, as the compressed gas in the gas chamber 4 expands and pushes the piston 3.

Figure 5:
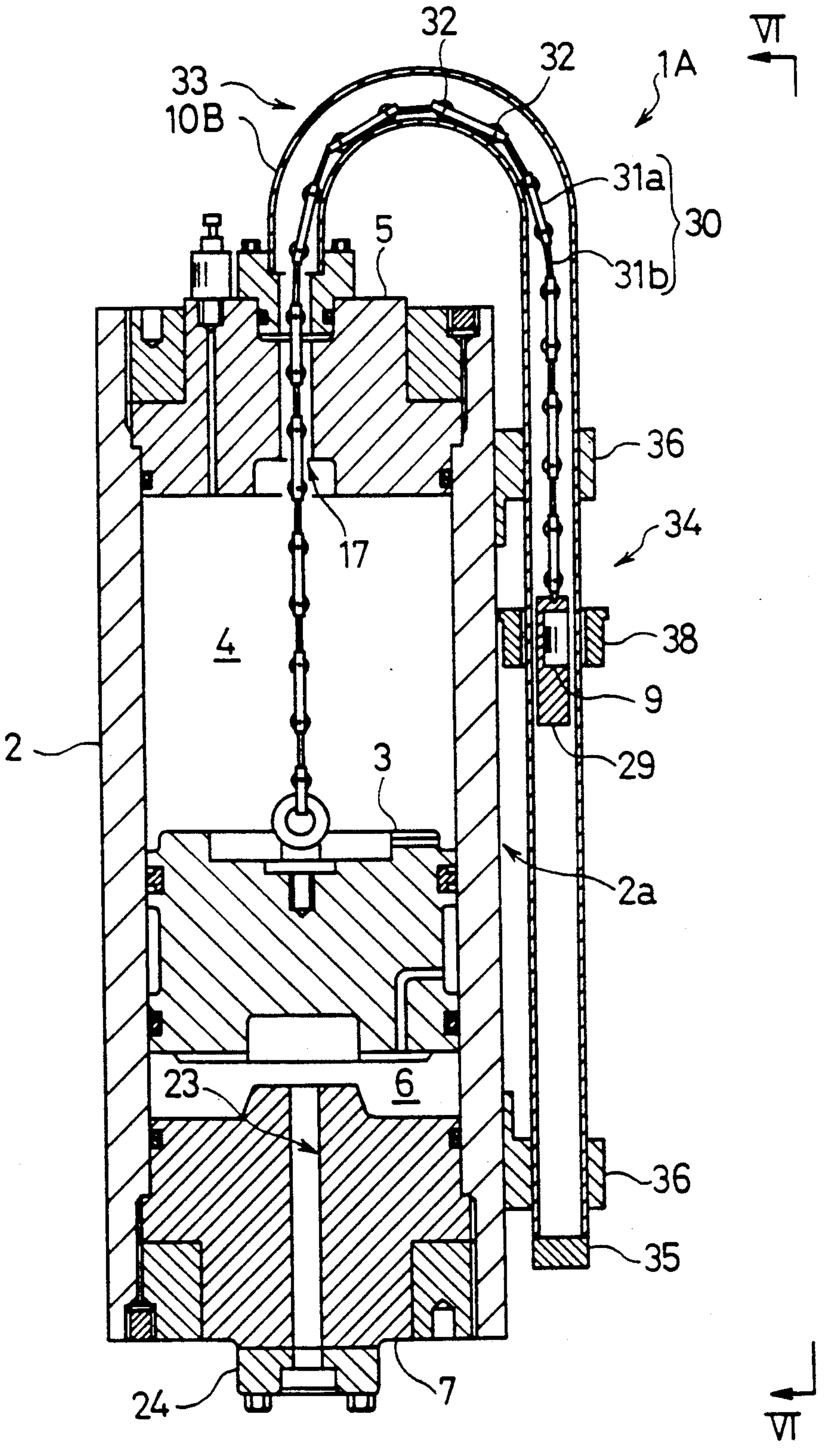
FIG. 5 is a sectional view of a vertical accumulator provided with a different device for detecting a current position of the piston.

A different type of detecting device is installed in the vertical accumulator 1A as shown in FIG. 5. A magnet 9 is mounted on a non-magnetic inductive holder 29 which is connected with a piston 3 by a non-magnetic inductive connecting means 30, e.g., roller chain composed of nylon links 31*a*, 31*b*, and rollers 32. The roller chain 30 is disposed movably in a U-shaped gas-tight tube 10B which is fixed to the containment shell 2.

The U-shaped gas-tight tube 10B is also made of non-magnetic inductive material, and comprises a U-shaped part 33 connected with a head cover 5 and a straight part 34 disposed along the shell 2. The holder 29 with the magnet 9 moves in the straight part 34 only, and the connecting means 30 is kept in a tensed state by the holder 29 serving as a weight. The precharged gas is filled not only in the gas chamber 4 but also in the U-shaped gas-tight tube 10B closed at its distal end by an end cover 35. The straight part 34 is preferably a fixed on the outer side 2*a* of the shell 2 by two brackets 36, 36.

Figure 6:
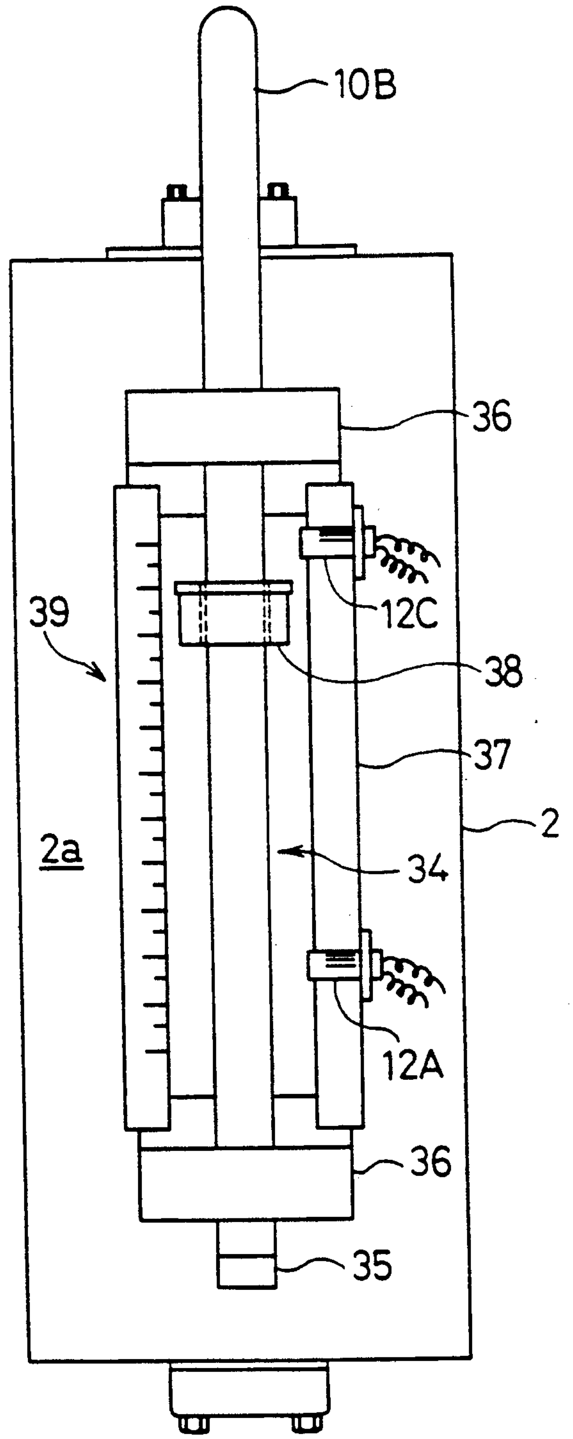
FIG. 6 is a sectional view of the VI—VI section of FIG. 5.

Referring to FIG. 6, a switch holder 37 is fixed to the outer side 2*a* of the shell 2 in parallel with the straight part 34 of the U-shaped gas-tight tube 10B. One reed relay 12C is installed on the upper part of the switch holder 37 and another reed relay 12A on the lower part thereof. The reed relay 12C is actuated by the magnet 9 when it rises to a selected upper limit position, while relay 12A is actuated when the magnet 9 descends to a selected lower limit position. Actuating reed relay 12A indicates that the piston 3 has risen upward excessively and that some of precharged gas in the gas chamber 4 has leaked out.

If a magnetic inductive indicater 38 is provided slidably along the outside of straight part 34 of U-shaped gas-tight tube 10B, the indicator 38 moves in response to the movement of the magnet 9 therein. Reading the divisions of a scale 39 provided along straight part 34 in relation to a position of to the indicator 38 indicates a corresponding position of the piston 3 within the range of the piston stroke and thus reveals normal or abnormal operation of hydraulic system.

Figure 7:
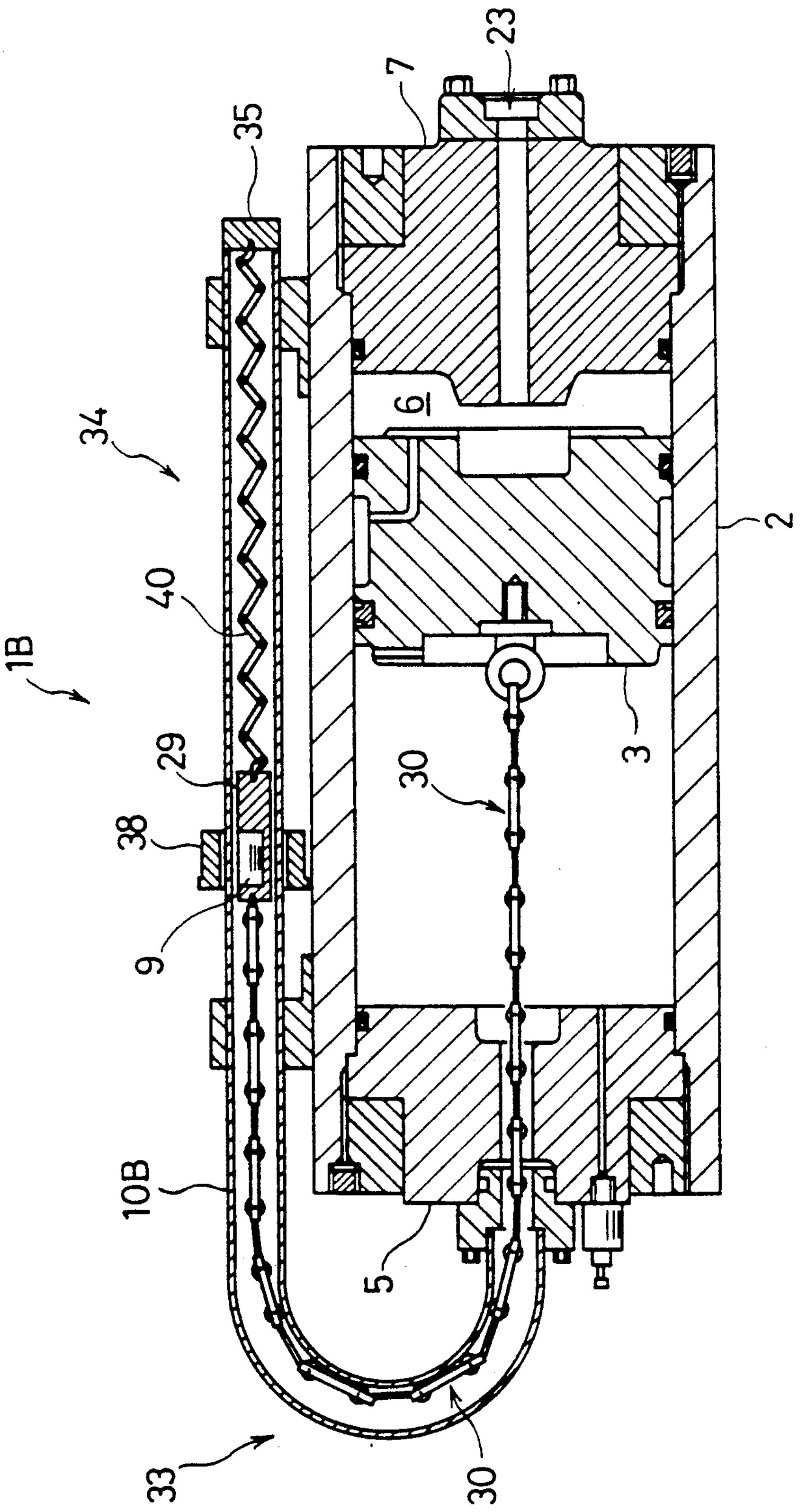
FIG. 7 is a sectional view of a horizontal accumulator provided with the different detecting device.

In the case of a horizontal accumulator 1B as shown in FIG. 7, a holder 29 carrying a magnet 9 inside is connected with an end cover 35 by a spring 40 and the connecting means 30 is always tensed thereby. The holder 29 is subjected to a biasing force by the spring 40 toward the edge cover 35, and the magnet 9 will move according to the displacement of the piston 3 as same as in FIG. 4.

As can be understood from the above description, when one or more switch means or magnetic inductive indicators capable of detecting a position of the piston in the accumulator are provided, the behavior of the piston can be observed in detail by means of signals given from the switch means or from a visually readable scale corresponding to the position of the indicator. When the edge of a detecting rod is inserted in the range of maximum displacement of the piston, excessive movement of the piston is detected. Hence, a user is informed that the pressure of gas filled in the gas chamber decreases below the initial precharged pressure therein. If the detecting device is provided with a magnet subjected to acting force by a spring, the detecting device is also available in a horizontal holizontal accumulator.

Accordingly, prompt recognition of probrems in the accumulator and with fluid-actuated elements in the piping device or valves is possible through such observation of the behavior of the piston. Resolution of problems is expedited and time and labor for repairs are saved. Output signals from the detecting means can also be utilized in known manner for automatic control of a hydraulic system provided with the accumulator as taught herein.

What is claimed is:

1. A piston type accumulator, provided with an oil chamber bounded by a piston reciprocatingly incorporated in a cylindrical containment shell for accumulating a pressurized hydraulic fluid in a hydraulic system communicating therewith, the accumulator also having a gas chamber precharged with pressurized gas, comprising:

a non-magnetic inductive detecting rod capable of movement in response to movement of said piston, inserted partially into said gas chamber through a guide hole of the containment shell;

a non-magnetic inductive gas-tight sealed tube means fixed to the outside of the containment shell for sealingly covering the range of movement of an end of said detecting rod, said sealed tube means communicating with said gas chamber;

a permanent magnet carried by said detecting rod, mounted on said end thereof;

a detecting switch means installed on said tube means to be actuated by a magnetic force of the permanent magnet brought close thereto in response to a movement of the piston due to an accumulation of said hydraulic fluid in the oil chamber.

2. A piston type accumulator according to claim 1, wherein:

said tube means is provided with a plurality of reed relays, disposed along a direction of movement of said permanent magnet.

3. A piston type accumulator according to claim 1, wherein:

said end of the detecting rod is inserted to extend into the range of maximum displacement of the piston, so that said detecting switch means is actuated by movement of the magnet in response to an excessive displacement of the piston due to leakage of pressurized gas from the gas chamber.

4. A piston type accumulator according to claim 1, wherein:

said tube means contains a spring which provides a bias force pushing said permanent magnet to a mother position thereof.

5. A piston type accumulator provided with an oil chamber bounded by a piston reciprocatingly incorporated in a cylindrical containment shell for accumulating a pressurized hydraulic fluid in a hydraulic system communicating therewith, the accumulator also having a gas chamber precharged with pressurized gas, comprising:

a non-magnetic inductive connecting means capable of movement in response to movement of said piston connected therewith, inserted partially into said gas chamber through a guide hole of the containment shell;

a non-magnetic inductive U-shaped gas-tight tube means for covering the connecting means and the range of movement of the magnet, providing a U-shaped part communicated to said gas chamber and a straight part disposed along the containment shell;

a permanent magnet carried by said connecting means, mounted on said end thereof;

a detecting switch means, actuated by a magnetic force of the magnet brought close thereto in response to movement of the piston due to an accumulation of said hydraulic fluid in the oil chamber, the switch means being installed on said straight part of the non-magnetic inductive U-shaped gas-tight tube means.

6. A piston type accumulator according to claim 5, wherein:

a magnetic inductive indicator is provided to be slidable along an outer surface of the straight part of the non-magnetic inductive U-shaped gas-tight tube means by means of a magnetic force of the magnet carried by the connecting means.

7. A piston type accumulator according to claim 5, wherein:

said non-magnetic inductive U-shaped gas-tight tube means contains a spring connecting an end cover thereof with a magnet holder carrying said magnet so that the connecting means is always maintained in a tensed state.

* * * * *